United States Patent [19]

Lewis et al.

[11] Patent Number: 5,222,081
[45] Date of Patent: Jun. 22, 1993

[54] METHOD OF PERFORMING AN AUTOBAUD FUNCTION USING A STATE FLOW MACHINE

[75] Inventors: Ronald C. Lewis, Huntsville; Barry L. Boike, Cullman, both of Ala.

[73] Assignee: Universal Data Systems, Inc., Huntsville, Ala.

[21] Appl. No.: 722,805

[22] Filed: Jun. 28, 1991

[51] Int. Cl.⁵ .......................................... H04C 25/38
[52] U.S. Cl. .................................. 375/117; 375/121
[58] Field of Search ................... 375/8, 121, 113, 114, 375/117; 370/105.4, 84; 340/825.07

[56] References Cited

U.S. PATENT DOCUMENTS 4,868,850  9/1989  Kaku et al. .................... 375/8 X Primary Examiner—Curtis Kuntz
Assistant Examiner—Tesfaldet Bocure
Attorney, Agent, or Firm—Wayne J. Egan

[57] ABSTRACT

A method of performing an autobaud function in data communication equipment utilizing a predetermined state flow machine for processing the bits of at least a portion of a command bit stream for identifying transmit characteristics of a corresponding information bit stream.

10 Claims, 5 Drawing Sheets

```
(7 BITS)          A                          T
      LSB           MSB P  S         LSB         MSB P  S
  BIT 1 2 3 4 5 6 7  8  9       BIT 1 2 3 4 5 6  7  8  9
  ODD  1 0 0 0 0 0 1  1  1̄          0 0 1 0 1 0  1  0  1̄
  EVEN 1 0 0 0 0 0 1  0  1̄          0 0 1 0 1 0  1  1  1̄
  MARK 1 0 0 0 0 0 1  1  1̄          0 0 1 0 1 0  1  1  1̄
  SPACE 1 0 0 0 0 0 1  0  1̄         0 0 1 0 1 0  1  0  1̄
  NONE 1 0 0 0 0 0 1  1̄  1̄          0 0 1 0 1 0  1  1̄  1̄
```

```
(8 BITS)           A                           T
      LSB            MSB P  S         LSB          MSB P  S
  BIT 1 2 3 4 5 6 7  8  9 10     BIT 1 2 3 4 5 6  7  8  9 10
  ODD  1 0 0 0 0 0 1 0  1  1̄         0 0 1 0 1 0  1  0  0  1̄
  EVEN 1 0 0 0 0 0 1 0  0  1̄         0 0 1 0 1 0  1  0  1  1̄
  MARK 1 0 0 0 0 0 1 0  1  1̄         0 0 1 0 1 0  1  0  1  1̄
  SPACE 1 0 0 0 0 0 1 0  0  1̄        0 0 1 0 1 0  1  0  0  1̄
  NONE 1 0 0 0 0 0 1 0  1̄  1         0 0 1 0 1 0  1  0  1̄  1̄
```

(7 BITS)

| | | a | | | | | | | | | | t | | | | | | |
|---|---|---|---|---|---|---|---|---|---|---|---|---|---|---|---|---|---|---|
| | LSB | | | | | MSB | P | S | | LSB | | | | | MSB | P | S | |
| BIT | 1 | 2 | 3 | 4 | 5 | 6 | 7 | 8 | 9 | BIT | 1 | 2 | 3 | 4 | 5 | 6 | 7 | 8 | 9 |
| ODD | 1 | 0 | 0 | 0 | 0 | 1 | 1 | 0 | $\bar{1}$ | | 0 | 0 | 1 | 0 | 1 | 1 | 1 | 1 | $\bar{1}$ |
| EVEN | 1 | 0 | 0 | 0 | 0 | 1 | 1 | 1 | $\bar{1}$ | | 0 | 0 | 1 | 0 | 1 | 1 | 1 | 0 | $\bar{1}$ |
| MARK | 1 | 0 | 0 | 0 | 0 | 1 | 1 | 1 | $\bar{1}$ | | 0 | 0 | 1 | 0 | 1 | 1 | 1 | 1 | $\bar{1}$ |
| SPACE | 1 | 0 | 0 | 0 | 0 | 1 | 1 | 0 | $\bar{1}$ | | 0 | 0 | 1 | 0 | 1 | 1 | 1 | 0 | $\bar{1}$ |
| NONE | 1 | 0 | 0 | 0 | 0 | 1 | 1 | $\bar{1}$ | $\bar{1}$ | | 0 | 0 | 1 | 0 | 1 | 1 | 1 | $\bar{1}$ | $\bar{1}$ |

*FIG.2C*

(8 BITS)

| | | a | | | | | | | | | | | t | | | | | | | |
|---|---|---|---|---|---|---|---|---|---|---|---|---|---|---|---|---|---|---|---|---|
| | LSB | | | | | | MSB | P | S | | LSB | | | | | | MSB | P | S | |
| BIT | 1 | 2 | 3 | 4 | 5 | 6 | 7 | 8 | 9 | 10 | BIT | 1 | 2 | 3 | 4 | 5 | 6 | 7 | 8 | 9 | 10 |
| ODD | 1 | 0 | 0 | 0 | 0 | 1 | 1 | 0 | 0 | $\bar{1}$ | | 0 | 0 | 1 | 0 | 1 | 1 | 1 | 0 | 1 | $\bar{1}$ |
| EVEN | 1 | 0 | 0 | 0 | 0 | 1 | 1 | 0 | 1 | $\bar{1}$ | | 0 | 0 | 1 | 0 | 1 | 1 | 1 | 0 | 0 | $\bar{1}$ |
| MARK | 1 | 0 | 0 | 0 | 0 | 1 | 1 | 0 | 1 | $\bar{1}$ | | 0 | 0 | 1 | 0 | 1 | 1 | 1 | 0 | 1 | $\bar{1}$ |
| SPACE | 1 | 0 | 0 | 0 | 0 | 1 | 1 | 0 | 0 | $\bar{1}$ | | 0 | 0 | 1 | 0 | 1 | 1 | 1 | 0 | 0 | $\bar{1}$ |
| NONE | 1 | 0 | 0 | 0 | 0 | 1 | 1 | 0 | $\bar{1}$ | $\bar{1}$ | | 0 | 0 | 1 | 0 | 1 | 1 | 1 | 0 | $\bar{1}$ | $\bar{1}$ |

*FIG.2D*

METHOD OF PERFORMING AN AUTOBAUD FUNCTION USING A STATE FLOW MACHINE

BACKGROUND OF THE INVENTION

The present invention relates to autobaud functions of data communication equipment, and more particularly to a method of performing an autobaud function in data communication equipment utilizing a predetermined state flow machine for processing the bits of at least a portion of a command bit stream.

In modern data communication systems, data terminal equipment (DTE), like personal computers, workstations and the like, communicate data among other DTE's over communication media utilizing correspondingly coupled data communications equipment (DCE), like modems or terminal adapters, for example. Generally, the DTE's are coupled to their respective DCE's by conventional asynchronous, serial communication lines, like RS-232 lines, for example. An information bit stream of digital data is transferred over the communication lines in the form of words or characters, conventionally represented by 7 or 8 coded bits, from the DTE to the DCE for conversion and transmission thereby over the communication media to a remote DCE and associated DTE. Each word or character generally has appended to it at least one parity bit which may be coded in accordance with any one of a number of different parity types. Normally, the receiving DCE does not have prior knowledge of the transmit characteristics, i.e. bit rate, word length, and parity type, of the information bit stream which it is about to receive from the DTE.

For this purpose, an autobaud function may be implemented in the DCE in accordance with some predetermined command standard in order for the DCE to determine such transmit characteristics from attention characters of a command bit stream which precedes the information bit stream of the digital data transfer. Some DCE's respond to a command bit stream which includes certain predetermined ASCII attention characters in sequence in order to determine the word length and parity type of the remaining command bit stream and the succeeding information bit stream.

One presently known autobaud function starts by measuring the length of a start bit of the first attention character which precedes the first attention character of the command bit stream, then samples and rotates each received bit of the first ASCII attention character into a byte, then samples the next two bit intervals for parity type and word length information which is saved. After the first attention character is received, the same operation, except for the measurement of the length of the start bit, is performed for the second attention ASCII character of the command bit stream. Once all of the information of the characters is gathered, a decision on the transmit characteristics of word length and parity type is made and the DCE is configured based on the measured bit rate and word length and parity type determined from the associated attention characters of the command bit stream. In this autobaud procedure, much of the processing to determine the word length and parity type is performed after all of the attention characters of the command bit stream has been received and before the first bit of the remaining command bit stream, which may begin as soon as one half of one bit interval after the last bit of the attention characters has been sampled.

Most modern DCE's use digital signal processors or micro controllers for processing the bit streams transferred thereto from their associated DTE's. Existing processors of the DCEs are generally limited in performance, that is, the processor may be capable of executing the decision making steps of the gathered information of the command bit stream for determining the word length and parity type within the one half bit interval for a bit rate of say 4800 or 9600 bits per second, for example; however, with higher bit rates say on the order of 20–40 kilobits per second, the DCE processor may not achieve a successful autobaud task within the allowable time frame. Of course, it is always possible to substitute a higher performance processor, but this tends to affect the cost of the DCE and ultimately, the market competitiveness thereof.

Accordingly, it is desired to perform the autobaud function in a DCE substantially independent of the transferring data bit rate from an associated DTE without incurring additional significant costs so as not to affect market place competitiveness of the DCE. It would also be desirable to implement the autobaud function at the higher transfer bit rates without having to provide additional special purpose hardware to achieve the autobaud capability at such higher rates.

SUMMARY OF THE INVENTION

In accordance with the present invention, an autobaud function is performed in data communication means by a method utilizing a predetermined state flow machine. A command bit stream, including a plurality of coded bits, is received from a communication medium coupled to the data communication means. The command bit stream defines transmit characteristics of a corresponding information bit stream to be successively received over the communication medium. The predetermined state flow machine which has a multiplicity of states is started at an initial current state. The state flow machine includes a set of final states which correspondingly define a unique set of transmit characteristics for information bit streams. The code of each bit of the command bit stream is identified and the current state of the state flow machine is advanced to a next state for each bit of at least a portion of the command bit stream based on the identified code thereof. The next state becomes the current state for the successive bit of the portion of the command bit stream. A final state of the set of states is arrived at based on the identified code of a predetermined bit of the command bit stream. And, the data communication means is set to receive the information bit stream based on the transmit characteristics defined by the final state arrived at from the corresponding command bit stream.

BRIEF DESCRIPTION OF THE DRAWINGS

FIG. 1 is a block diagram schematic of data communication equipment suitable for embodying the principles of the present invention.

FIGS. 2A–2D illustrate the character bit streams for uppercase and lowercase characters A(a) and T(t) of characteristics of seven bits and eight bits and include a variety of parity types.

DESCRIPTION OF THE PREFERRED EMBODIMENT

Figures 1, 2A, 2B:
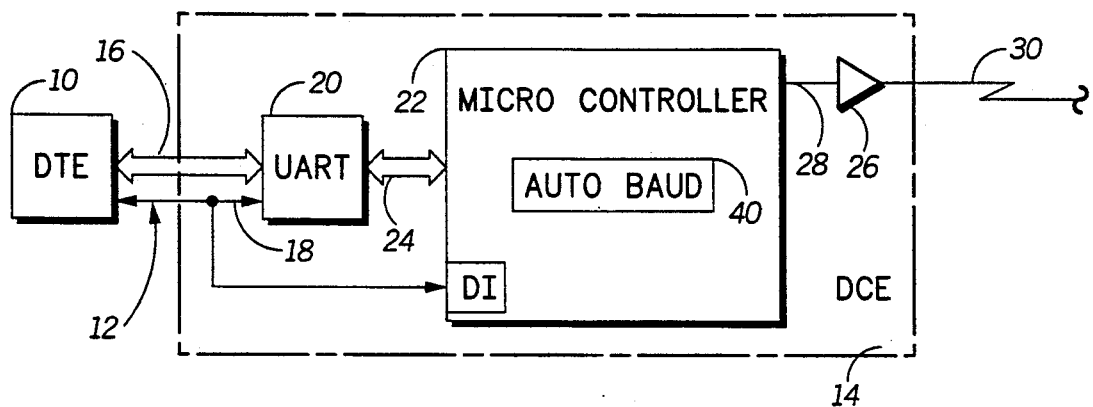

A block diagram schematic of digital communications equipment (DCE) suitable for embodying the principles of the present invention is shown in FIG. 1. Referring to FIG. 1, data terminal equipment (DTE) 10 is operative to transmit digital data in the form of an information bit stream over a communication medium 12 to a DCE 14. The communication medium 12 may be of the RS-232 standard variety including a plurality of control lines 16 and a serial data bus 18, for example. The communication medium 12 may be coupled to a universal asynchronous receive transmit (UART) module 20 of the DCE 14 which, in turn, is coupled to a micro controller 22 utilizing conventional bus lines 24 thereof. The serial bus 18 may also be coupled to a digital input (DI) of the micro controller 22. For the present embodiment, the micro controller 22 may be of the type manufactured by Intel Corporation bearing the Model No. 8032, for example. In turn, the micro controller 22 is coupled to a conventional conversion unit 26 by signal lines 28 for transferring digital data thereto. The conversion unit 26 converts the digital data into conventional analog communication signals for transmission over telephone lines 30 or similar communication media, to another DCE (not shown) which may be either local or remote to the DCE 14.

In the present embodiment, the information bit stream of digital data is transferred from the DTE 10 to the DCE 14 over the asynchronous, serial communication lines 12 in the form of characters represented typically by 7 or 8 digitally coded bits and conventionally followed by a parity bit, the code of which being based on a predetermined parity type. Accordingly, the UART 20 and micro controller 22 are operative, when activated, to sample the serially incoming digital data bits of the characters in order to determine and process the digital codes thereof. Since the digital data is transferred asynchronously, that is without a clock signal, the UART 20 and micro controller 22 need a way of determining when to sample each bit to accurately determine the code status thereof. This is accomplished in the present embodiment by preceding and appending each character with a start bit and a stop bit, respectively.

It is further understood that the digital data may be transferred from the DTE 10 over the communication lines 12 using different transmit characteristics, like bit rate, character or word length, and parity type, for example. To inform the DCE 14 of the transmit characteristics of an impending information bit stream and possibly to initiate a connection, the DTE 10 precedes the information bit stream with a command bit stream, which may be comprised of one or more characters which is itself preceeded by the attention character, containing the transmit characteristic information of the corresponding information bit stream to be successively received by the DCE 14. One type of command bit stream which is well known in the communication industry and is suitable for use in the present embodiment is the AT command set. In this command bit stream, the attention characters are A and T, either uppercase or lowercase. FIGS. 2A and 2B illustrate the character bit streams for uppercase characters A and T of word or character lengths of 7 bits and 8 bits, respectively, including a variety of parity types like odd, even, mark, space and none, for example. Similarly, FIGS. 2C and 2D illustrate character bit streams for the lowercase characters a and t of 7 bits and 8 bits, respectively, including the same variety of parity types. For these examples, the characters A(a) and T(t) are represented by an ASCII binary code. The least significant bit (LSB) is the first bit of the character transmitted followed by the remaining bits and ending with the most significant bit (MSB) and parity P and stop S bits.

When in the idle state, the serial bus 18 remains in a mark state which, in most cases, is a binary one or high state. The start bit of a character causes the status of the serial line 18 to change binary states from mark to space or binary 1 to binary 0. This transition signifies the beginning of the start bit which is represented by a space. Accordingly, keeping the serial line 18 at the mark state during idle guarantees this transition from 1 to 0 for the start bit. Also, in the present command bit stream, the first character to be transmitted is the A or a character which has a binary 1 for the first bit thereof which insures that the start bit will be immediately followed by a mark. Therefore, under these conditions, the start bit of the command bit stream is delineated in time by preceding and succeeding marks which make it possible to measure the length of the start bit by starting and stopping a timing mechanism in accordance with the 1 to 0 and 0 to 1 transitions of the serial line 18. This length measurement of the start bit is representative of the bit rate of the command and information bit streams.

In addition, by identifying the binary codes of the 8th and 9th bits of the A (a) and T (t) characters of the command bit stream, it is possible to determine the word or character length thereof and distinguish between the variety of parity types. For example, if the parity type is "space", then the parity bit P is 0 for both the A and the T characters, but if the parity is "even", then the parity bits would be 0 and 1 respectively, for the A and T characters. The character size may also be determined by the 8th and 9th bits of the A and T characters. Taking the example of "even" parity, the 8th and 9th bits may be 01 and 11 for the A and T characters, respectively, but since the 9th bit is 1 for both characters, it is determined to be the stop bit which implies that the character length is 7 bits plus parity. Other combinations of word length and parity type may likewise be determined.

Figure 3:
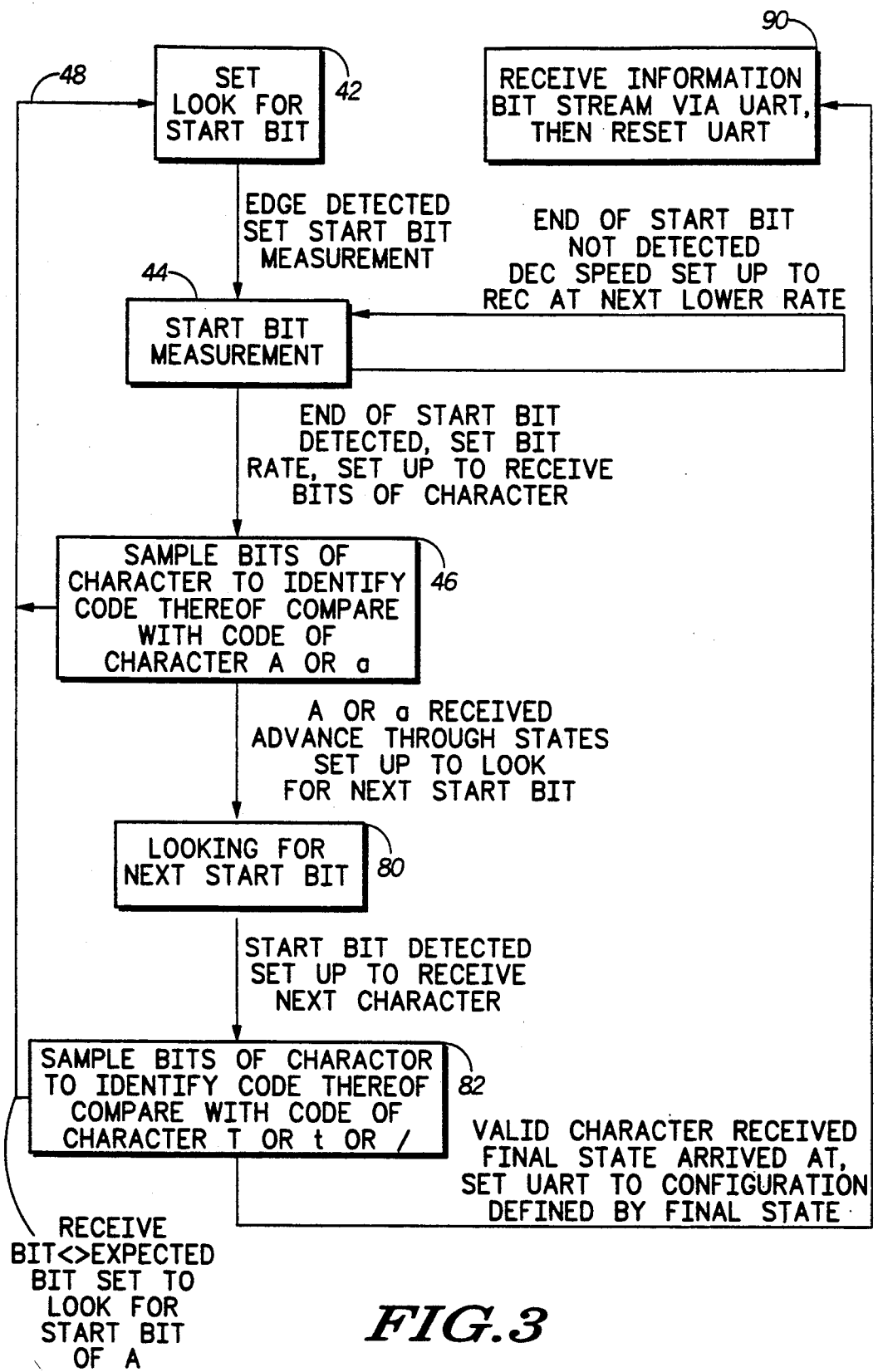
FIG. 3 is a block flow diagram exemplifying a software architecture of an autobaud function suitable for use in the embodiment of FIG. 1.
Figure 4A:
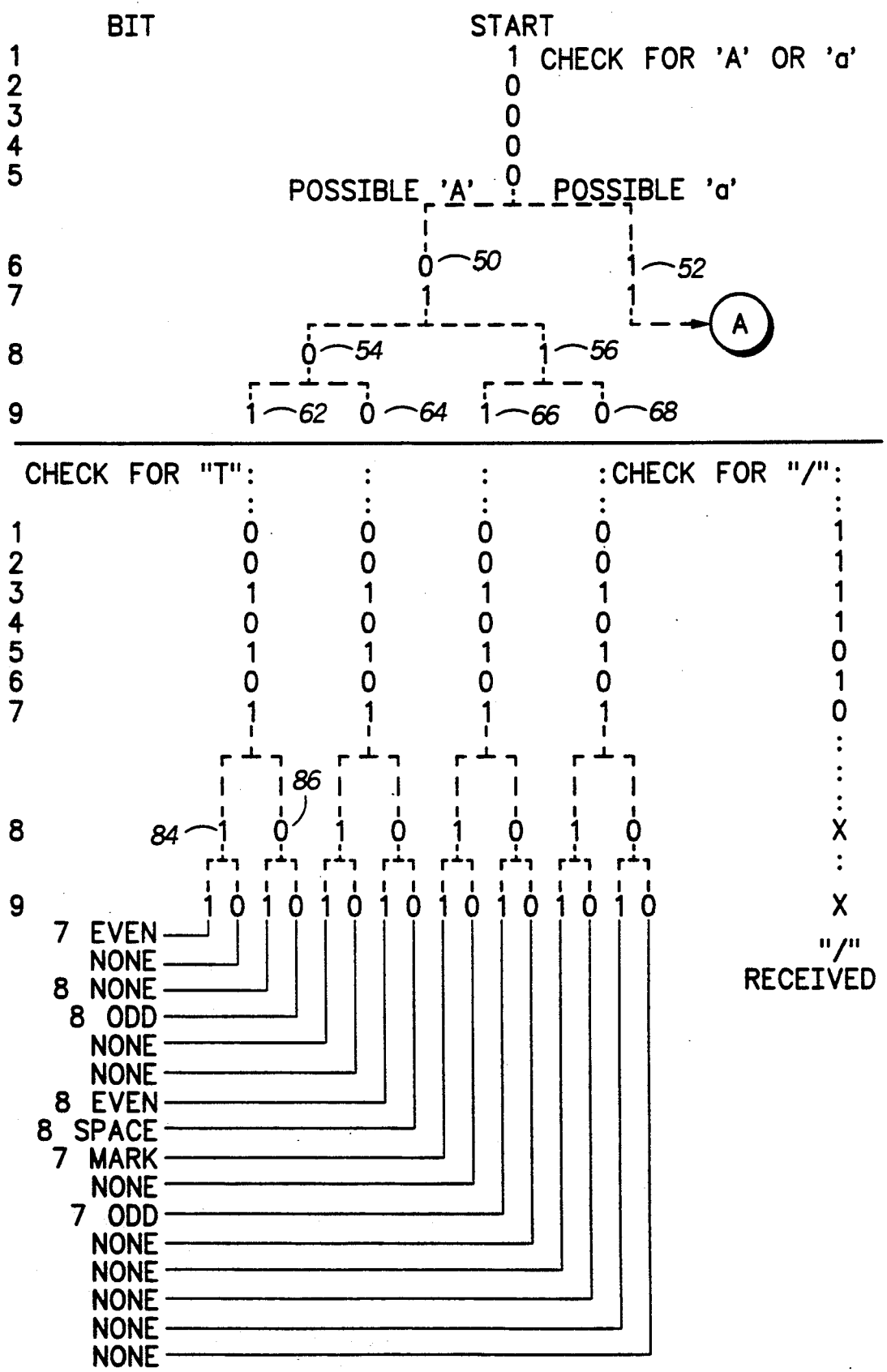
FIGS. 4A and 4B depict a suitable state flow machine for use in an autobaud function.
Figure 4B:
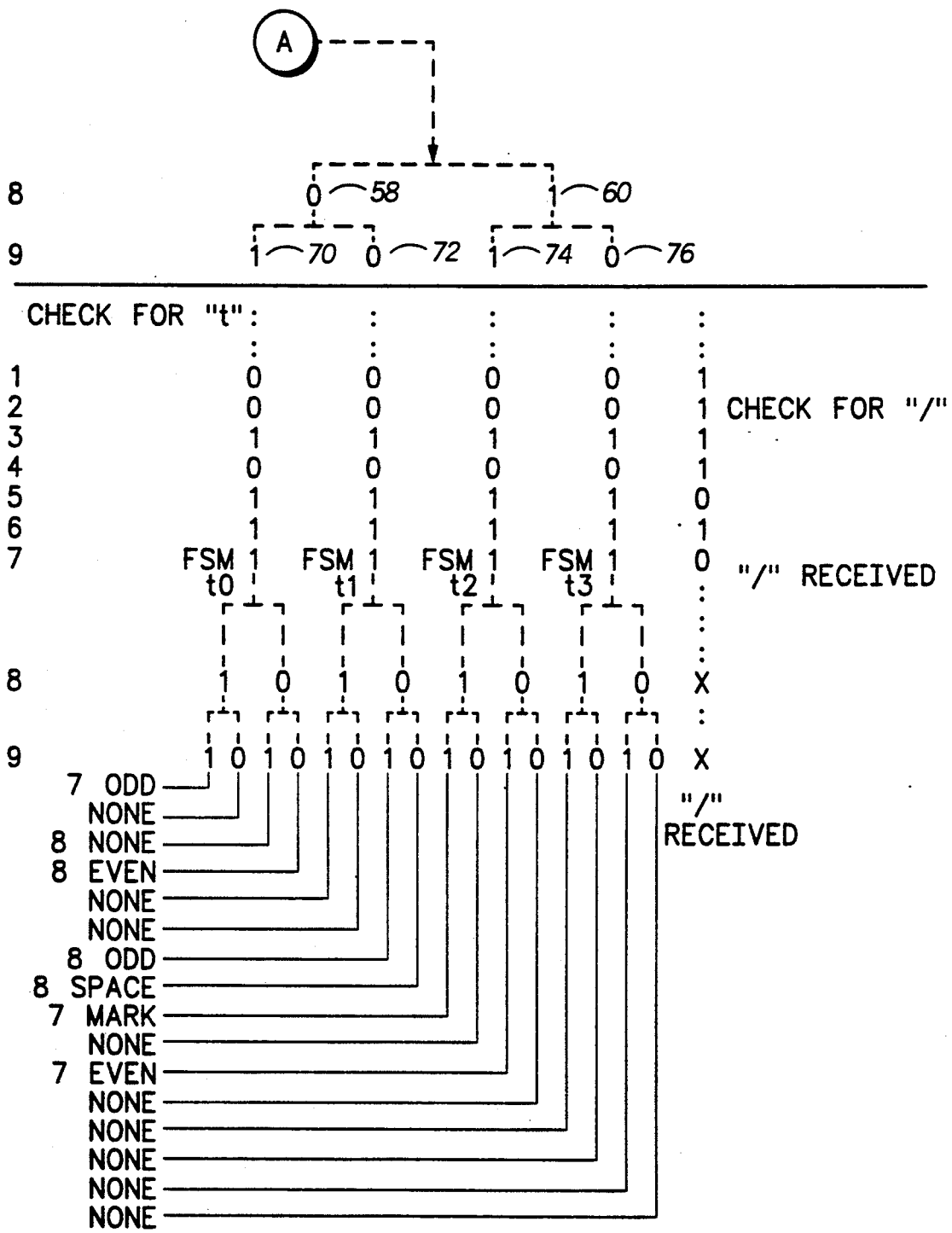

As has been indicated above, the transmit characteristics are determined by an autobaud function which may be embodied as a software routine in the micro controller 22, such as that shown at 40, for example. An exemplary embodiment of the autobaud function 40 in accordance with the present invention shall be described in connection with the FIGS. 3, 4A and 4B. FIG. 3 is a block flow diagram exemplifying a software architecture of the autobaud function 40 for use in the micro controller 22 and FIGS. 4A and 4B depict a suitable state flow machine for use in the autobaud function routine 40. When in the idle state, i.e. no data transmission, the micro controller 22 is monitoring the serial line 18 via the port DI for the start of data transmission thereover. More specifically, in block 42 of FIG. 3, the autobaud routine 40 is either set or initiated to sample the port DI particularly at approximately 16 times the selected bit rate looking for a mark to space (1-0) transition of the line which signifies the beginning of the start bit or is interrupted by the mark to space transition.

When the transition or edge is detected, the start bit measurement begins and is carried out in the flow block 44. In the present embodiment, the bit rate is preset at the highest rate and decremented for each predetermined interval in time in which the end of start bit is not detected. At the transition of space to mark which signifies the end of the start bit, the measurement of the bit rate of the command and information bit streams is concluded and the routine 40 is set up to receive at the measured bit rate the bits of the uppercase or lowercase character A or a which task is performed in the flow block 46. In block 46, the character bits are sampled to identify the code thereof according to the measured bit rate. In the particular embodiment, the bit intervals are sampled at approximately mid point. The identified codes of the character are compared with stored (expected) binary codes and if the code of the received bit is not matched to the expected bit, then the routine flow is diverted through path 48 back to block 42 and the autobaud routine is set to look for another start bit of the character A or a.

The state flow machine diagram of FIGS. 4A and 4B exemplify the first seven bits or states during which the identified binary codes of the received character are compared state by state with the expected codes of the stored character. Note that if the sixth bit or state is a zero, the state flow path is advanced to a next state 50 of the machine indicating a possible uppercase A character, or if a one advanced to a next state 52 of the machine indicating a possible lowercase a character. Once it is determined that either an uppercase A or lowercase a character has been received via the state flow machine, the machine continues to be advanced from a current state to a next state for each of the bits 8 and 9 of the character A or a based on the identified binary codes thereof. For example, if the character is determined to be uppercase and the 8th bit is a binary 0, the machine advances to state 54. Likewise, if the 8th bit of the uppercase A character is a binary 1, the machine advances to the state 56. A similar advancement in states occurs for the lowercase a character in which the machine advances through the states 58 or 60 dependent on whether the binary code of the 8th bit is a 0 or 1, respectively. Next, the 9th bit is sampled and the binary code thereof identified. Dependent on whether the binary code is a 1 or a 0 the state of the machine will advance from a current to one of two next states; that is, if the current state is 54, the machine advances from state 54 to state 62 or 64, respectively; if the current state is 56, the state machine advances to state 66 or 68, respectively; if the current state is 58 the state machine advances to state 70 or 72, respectively; and if the current state is 60, then the next state shall be 74 or 76, respectively.

Once the autobaud routine 40 has advanced through the states for the character A (a) or the first attention character of the command bit stream, it sets itself up to look for the start bit of the next character in succession which, for the present case, is the character T (t). This is performed in the flow block 80 in the same manner as that described for the block 42 except that for subsequent characters of the command bit stream, no start bit measurement is performed. Once the start bit is detected, the autobaud routine 40 is set up to receive the bits of the next character.

In flow block 82, the autobaud routine 40 samples the bits of the instant character to identify the binary code thereof and compares the identified code with the stored codes of the expected character, i.e. T or t or /. In determining whether or not the instant character is a valid character, the autobaud function starts from the state in which it resided after processing the first character or A (a). If uppercase A, the state flow machine will start from one of the states 62, 64, 66 or 68 in checking for the T character and likewise, if the first character was a lowercase a, the state flow machine will start from one of the states 70, 72, 74 or 76 for determining a valid character t. In addition, if any of the first seven bits or flow states of the T (t) character do not yield a match, then the next state is advanced along path 48 back to the flow block 42 and the autobaud routine 40 is set up to look for the start bit of the first character A or a. Otherwise, the state flow machine is advanced from its current state to a next state in accordance with the identified binary codes of the 8th and 9th bits of the instant character until a final state is arrived at at a predetermined bit of the command bit stream. For this embodiment, the predetermined bit is the 9th bit of the second character of the bit stream.

For example, suppose the state flow diagram resided in state 62 after processing of the A character then, the state flow machine is advanced to either state 84 or 86 dependent on whether or not the 8th bit is identified as being a binary 1 or a binary 0. Thus, upon identifying the code of the 9th bit, a final state is arrived at for determining the transmit characteristics of the corresponding information bit stream. For example, if the 8th and 9th bits are: 1 1, then the word length is determined to be 7 bits and the parity type even; 1 0 then the parity type is none; 0 1, then the word length is 8 bits with the parity type of none; and, 0 0, then, the word length is 8 bits with an odd parity type. This same procedure is followed in the state flow machine example of FIGS. 4A and 4B for the other states 64, 66, 68, 70, 72, 74 and 76 which all result in a final state upon the decoding of the 9th bit of the second character.

It is understood that little or no further processing is necessary once the final state is arrived at at the decoding of the 9th bit for determining the transmit characteristics of the corresponding information bit stream. Next, the UART 20 is configured according to the definition of the final state and the measured bit rate utilizing the control lines 24. Thereafter, in the flow block 90 the micro controller 22 is instructed to receive the remaining command bit stream and information bit stream via the UART 20 over the signal lines 24 and process the received data thereof accordingly in a conventional manner for local processing or for transmission over the telephone line 30 via the conversion and transmit unit 26. Upon completion of the transfer of the information bit stream, the UART 20 is reset in accordance with the instructions of the block 90 and the program execution of the autobaud routine 40 is returned to the block 42.

In summary, it is respectfully pointed out that the steps of identifying the binary code of each bit and advancing the states of the state flow machine may be performed on each bit of the command bit stream at the time of reception thereof, thereby distributing the autobaud processing over the time of reception of the attention characters of the command bit stream. This makes it possible to arrive at a final state or ultimate determination of transmit characteristics substantially independent of the bit rate of the bit stream within the reception interval prior to receiving the remaining command bit stream and corresponding information bit stream. Thereafter, the only processing left for the autobaud routine 40 to accomplish is to configure the UART 20 to receive the command and information bit streams via the serial link 18 in accordance with the transmit characteristics defined by the final state of the state flow machine and measured from the start bit.

It is understood that while the present embodiment has been described in connection with a single embodiment hereabove, additions, modifications and deletions may be made to the described embodiment or an equivalent embodiment may be used without deviating from the principles of the present invention. Accordingly, the present invention should not be limited to any single embodiment but rather construed in both breadth and scope in accordance with recitation of the appended claims.

We claim:

1. In a data communications equipment ("DCE"), a modem or a terminal adapter, the DCE arranged for receiving a command bit stream and an information bit stream from a data terminal equipment ("DTE"), a personal computer or work station, the information bit stream including a plurality of words characterized by transmit characteristics, the transmit characteristics including bit rate, word length and parity type, the DCE including a state flow machine having a multiplicity of states, the multiplicity of states including an initial current state and a set of final states, the set of final states correspondingly defining a unique set of transmit characteristics, a method of adjusting the DCE for receiving the information bit stream based on the transmit characteristics, said method comprising the steps of:

(a) receiving the command bit stream, said command bit stream including a plurality of coded bits defining one or more transmit characteristics of the corresponding information bit stream to be successively received from the DTE;

(b) starting at the initial current state of the state flow machine;

(c) identifying the code of each bit of the command bit stream;

(d) advancing from said current state to a next state of said state flow machine for each bit of at least part of the command bit stream based on the identified code thereof, said next state becoming the current state for the successive bit of the part of the command bit stream;

(e) arriving at a final state of said set based on the identified code of a predetermined bit of the command bit stream; and (f) adjusting the DCE to receive the information bit stream based on the transmit characteristics defined by the final state as in the arriving step (e).

2. The method in accordance with claim 1 wherein the receiving step (a) includes a step of receiving a start bit, the start bit preceding the command bit stream, and further including a step of determining the bit rate based on the start bit.

3. The method in accordance with claim 2 wherein the identifying step (c) includes a step of sampling each bit of the command bit stream based on the determined bit rate to identify the code thereof.

4. The method in accordance with claim 1 wherein the identifying step (c) and the advancing step (d) are performed on each bit of at least part of the command bit stream at the time of reception thereof.

5. The method in accordance with claim 4 wherein the arriving step (e) is performed within a reception interval of the predetermined bit.

6. The method in accordance with claim 1 wherein the command bit stream includes a plurality of words, each word having transmit characteristics of bit rate, word length and parity type.

7. The method in accordance with claim 6 wherein the receiving step (a) includes a step of receiving a start bit, the start bit preceding the plurality of words, and further including a step of determining the bit rate by measuring the length of the start bit.

8. The method in accordance with claim 7 wherein each final state of said state flow machine defines the word length and parity type.

9. The method in accordance with claim 8 wherein the plurality of words includes the ASCII characters A and T, either uppercase or lowercase.

10. The method in accordance with claim 9 wherein the steps (a) through (f) are performed by a micro controller of the DCE, the DCE including a universal asynchronous receive transmit ("UART") circuit, the UART being configured based on the transmit characteristics of the arrived at final state to receive the corresponding information bit stream from the DTE.

* * * * *